(12) United States Patent
Legoll et al.

(10) Patent No.: US 8,220,331 B2
(45) Date of Patent: Jul. 17, 2012

(54) SYSTEM FOR ANALYSING THE FREQUENCY OF RESONATING DEVICES

(75) Inventors: Sébastien Legoll, Bourg les Valence (FR); Patrice Guillard, Valence (FR)

(73) Assignee: Thales (FR)

( * ) Notice: Subject to any disclaimer, the term of this patent is extended or adjusted under 35 U.S.C. 154(b) by 1090 days.

(21) Appl. No.: 12/126,820

(22) Filed: May 23, 2008

(65) Prior Publication Data

US 2008/0289419 A1 Nov. 27, 2008

(30) Foreign Application Priority Data

May 25, 2007 (FR) ...................................... 07 03733

(51) Int. Cl.
*G01H 11/06* (2006.01)
(52) U.S. Cl. ................................ 73/579; 73/649; 702/56
(58) Field of Classification Search .................... 73/579, 73/649, 650, 651, 503, 503.3, 504.01, 504.02, 73/504.03, 504.04, 504.08; 702/56, 141, 702/142, 145, 147
See application file for complete search history.

(56) References Cited

U.S. PATENT DOCUMENTS

| | | | | |
|---|---|---|---|---|
| 2,822,515 | A * | 2/1958 | Klaasse | 324/247 |
| 4,761,743 | A * | 8/1988 | Wittke | 702/41 |
| 2004/0123665 | A1 | 7/2004 | Blodgett et al. | |
| 2004/0150412 | A1* | 8/2004 | Hayashi et al. | 324/635 |
| 2004/0226377 | A1* | 11/2004 | Tsugai | 73/514.32 |
| 2005/0128552 | A1* | 6/2005 | Yasuda et al. | 359/223 |

FOREIGN PATENT DOCUMENTS

| | | |
|---|---|---|
| EP | 1132728 | 9/2001 |
| FR | 2590991 | 6/1987 |
| WO | WO02/087083 | 10/2002 |

* cited by examiner

*Primary Examiner* — Hezron E Williams
*Assistant Examiner* — Rose M Miller
(74) *Attorney, Agent, or Firm* — Lowe Hauptman Ham & Berner, LLP (57) ABSTRACT

The general field of the invention is that of resonating or vibrating devices. One of the tricky points with this type of device is that of correctly measuring the vibration frequency in a disturbed environment. The analysis system according to the invention is based on the use of the Hilbert transform of a function U representative of the position A of the vibrations of the device. More precisely, in its basic version, the analysis system comprises means making it possible to realize the second derivative of the function U denoted $U^{(2)}$, the Hilbert transform of the function U denoted V, the second derivative of this transform denoted $V^{(2)}$ as well as a function equal to

$$-\frac{U \cdot U^{(2)} + V \cdot V^{(2)}}{U^2 + V^2},$$

this latter function being mathematically equal to the function $$\omega_1^2 - \frac{\rho_1^{(2)}}{\rho_1}$$

with $\omega_1$ the instantaneous angular frequency of U, $\rho_1$ the instantaneous amplitude of U, $\rho_1^{(2)}$ the second derivative of said instantaneous amplitude and being representative of the square of the resonant angular frequency $\Omega$ of the vibrating device. Several variants of this initial device are proposed.

11 Claims, 3 Drawing Sheets

SYSTEM FOR ANALYSING THE FREQUENCY OF RESONATING DEVICES

RELATED APPLICATIONS

The present application is based on, and claims priority from, French Application Number 07 03733, filed May 25, 2007, the disclosure of which is hereby incorporated by reference herein in its entirety.

FIELD OF THE INVENTION

The field of the invention is that of resonating or vibrating devices. It is known that the principle of measurement of a large number of sensors is based on measuring the frequency of the oscillations of a mechanical system oscillating either under free oscillations, or under forced oscillations, this frequency depending on the parameter that one seeks to measure. Mention may be made, by way of example, of vibrating barrel accelerometers also called VBAs used to measure accelerations, it being understood that what follows may be readily generalized to any vibrating system.

DESCRIPTION OF THE PRIOR ART

Figure 1:
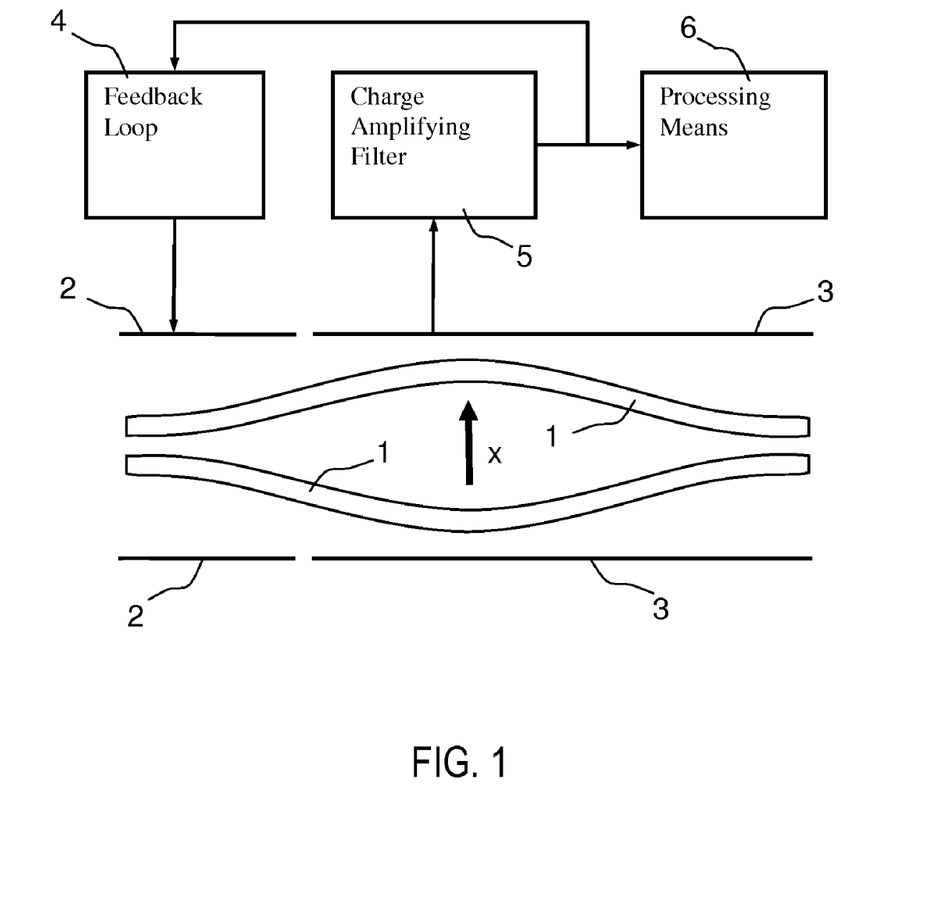
FIG. 1 represents the basic diagram of a vibrating-beams oscillator.

FIG. 1 depicts a basic diagram of an accelerometer of this type. It essentially comprises a mass connected to two identical and parallel beams 1 forming a tuning fork, each beam carries two electrodes 2 and 3, the first electrode 2 serving for excitation and the second electrode 3 for detection. Under the effect of an acceleration along the sensitive axis x of the accelerometer, the mass moves in translation along this sensitive axis thereby causing an extension or contraction of the tuning fork and thus modifying its resonant frequency according to relation 0 below.

$$f_a = f_0 \sqrt{1 + \frac{a}{\gamma_C}} \quad \text{Relation 0}$$

with $f_a$: resonant frequency of the accelerometer subject to the acceleration, $f_0$: resonant frequency of the sensor at rest, that is to say subject to a zero input acceleration, a: acceleration applied to the sensor, $\gamma_c$: critical buckling acceleration, a physical parameter of the resonator.

The principle of measuring the frequency is as follows. The excitation and vibration of the beams are sustained by the excitation electrode 2 covering a part of the length of each beam. The excitation voltage is the sum of a continuous voltage $V_0$ and of an alternating voltage v that alternates at the resonant frequency of the oscillator, created by feedback of the sensor output signal. The remainder of the surface of the two beams is covered by a detection electrode 3 polarized to the voltage $V_0$. The vibration motion of the beams causing the distance between the beams and this electrode to vary, a detection current appears in the electrode. This current passes into a charge amplifying filter 5. The voltage at the output of this filter constitutes the sensor output signal. This output signal is used on the one hand for the processing 6 making it possible to retrieve, from the resonant frequency measurement, the acceleration applied to the sensor and on the other hand as input into the feedback loop 4 making it possible to generate the alternating excitation voltage.

On the basis of the signals returned by the accelerometer, it is necessary to retrieve the acceleration applied to the sensor. The nonlinear nature of relation 0 poses a fundamental problem. Indeed, the acceleration a in relation 0 contains not only the useful acceleration applied to the sensor but also vibration terms that may reach very high values. The mass-spring system formed by the mass and the resonator exhibits a resonant frequency $f_R$. At this frequency, noise is greatly amplified. The acceleration applied to the sensor comprises a low-frequency term whose band typically lies over an interval varying from 0 Hz to 400 Hz which is the static or dynamic acceleration that one wishes to determine by virtue of the processing and a term centred on the frequency $f_R$ which typically lies between 3 kHz and 5 kHz which corresponds to the noise filtered by the mass-spring system and which forms parasitic vibrations that may degrade the results of the processing. These terms give rise both to a bias error and a scale factor error at the level of the acceleration. The level of the vibrations being random, these errors cannot be compensated for. Of course, these problems are common to any device subject to a parasitic variation of its input quantity.

The motion of the beams may be represented by an equivalent monodimensional oscillator along the direction and the sense of the sensitive axis of the sensor. The position denoted A of this oscillator satisfies the following differential equation denoted relation 1:

$$\frac{d^2 A}{dt^2} + \frac{\omega_0}{Q_R}\frac{dA}{dt} + \omega_0^2\left(1 + \frac{a}{\gamma_C}\right)A + \beta_i A^3 = e(t) \quad \text{Relation 1}$$

with $\omega_0$ the rest resonant angular frequency of the sensor, under zero acceleration, $Q_R$: quality factor of the resonator, $\gamma_c$: critical buckling acceleration of the sensor, a: acceleration applied to the sensor. This acceleration comprises both the low-frequency term that one seeks to measure and high-frequency terms due to the vibrations, $\beta_i$: nonlinearity coefficient of order 3, e(t): time dependent excitation term.

$$\omega_0 \sqrt{1 + \frac{a}{\gamma_C}}$$

is the resonant angular frequency of the vibrating system subjected to the acceleration a.

Generally, use is made of two resonators having sensitive axes of like direction and opposite sense making it possible to perform the measurement on two different pathways. The following two equations then hold: using the same notation as previously, the index 1 referring to pathway 1 and the index 2 to pathway 2.

Relation 2 on pathway 1

$$\frac{d^2 A_1}{dt^2} + \frac{\omega_{0,1}}{Q_{R1}}\frac{dA_1}{dt} + \omega_{0,1}^2\left(1 + \frac{a}{\gamma_{C,1}}\right)A_1 + \beta_{i,1} A_1^3 = e_1(t)$$

-continued

Relation 3 on pathway 2

$$\frac{d^2 A_2}{dt^2} + \frac{\omega_{0,2}}{Q_{R2}}\frac{dA_2}{dt} + \omega_{0,2}^2\left(1 - \frac{a}{\gamma_{C,2}}\right)A_2 + \beta_{i,2}A_2^3 = e_2(t) \quad 5$$

The current in the detection electrode is proportional to the speed of the equivalent oscillator. The transfer function of the charge amplifying filter is that of an integrator. The voltage output by the charge amplifier is obtained by integrating the speed of the equivalent oscillator. Though the signal corresponding to the position of the oscillator may comprise a low-frequency term, this term is not found again at the output of the charge amplifier. The voltage output by the charge amplifier is then proportional to the high-frequency terms of the oscillator position signal.

Denoting by $U_1$ and $U_2$ the voltages output by the filter on pathways 1 and 2, the following relations hold:

$U_1 = K_1 I_1$ and $U_2 = K_2 I_2$ with $K_1$ and $K_2$ known constants, depending on the mechanical and electrical parameters of the resonators and the charge amplifier, $I_1$ and $I_2$ representing the high-frequency parts of $A_1$ and $A_2$.

To determine the acceleration from the frequency, a first procedure consists in considering that the frequency denoted f of the sensor output signal is connected to the acceleration by the relation $$f \approx f_0 \sqrt{1 + \frac{a}{\gamma_C}}. \quad 30$$

Denoting by $f_1$ and $f_2$ the frequencies of the output signals on pathways 1 and 2 and by carrying out a finite expansion of said frequencies, the following relations are obtained:

$$f_1 \approx f_{0,1}\sqrt{1 + \frac{a}{\gamma_{C,1}}} \approx f_{0,1}\left(\begin{array}{c} 1 + \dfrac{a}{2\gamma_{C,1}} - \\ \dfrac{a^2}{8\gamma_{C,1}^2} + \dfrac{a^3}{16\gamma_{C,1}^3} + \ldots \end{array}\right) \quad \text{Relation 4}$$

$$f_2 \approx f_{0,2}\sqrt{1 - \frac{a}{\gamma_{C,2}}} \approx f_{0,2}\left(\begin{array}{c} 1 - \dfrac{a}{2\gamma_{C,2}} - \\ \dfrac{a^2}{8\gamma_{C,2}^2} - \dfrac{a^3}{16\gamma_{C,2}^3} + \ldots \end{array}\right) \quad \text{Relation 5}$$

The acceleration is decomposed:
into a first low-frequency useful part;
into a second part due to the vibrations at the resonant frequency of the mass-spring mode. The following are obtained respectively on pathways 1 and 2:

$a = a_0 + \alpha_{V,1}\cos(2\pi f_R t)$ $a = a_0 + \alpha_{V,2}\cos(2\pi f_R t)$ The acceleration may be estimated by virtue of a differential processing. Only the low-frequency terms of the difference of the frequencies are of interest. This yields the following relation:

$$\frac{f_1 - \dfrac{f_{0,1}}{f_{0,2}}f_2}{f_{0,1}} = a_0\left(\frac{1}{2\gamma_{C,1}} + \frac{1}{2\gamma_{C,2}}\right) + \quad 65$$

-continued $$\frac{a_0^2 + \dfrac{\alpha_{V,2}^2}{2}}{8\gamma_{C,2}^2} - \frac{a_0^2 + \dfrac{\alpha_{V,1}^2}{2}}{8\gamma_{C,1}^2} + \frac{a_0^3 + 3a_0\dfrac{\alpha_{V,1}^2}{2}}{16\gamma_{C,1}^3} + \frac{a_0^3 + 3a_0\dfrac{\alpha_{V,2}^2}{2}}{16\gamma_{C,2}^3}$$

This relation shows that:
the term of order 3 of the finite expansion not being eliminated by the differential processing, it causes a nonlinearity error corresponding to the term in $a_0^3$ and a scale factor error corresponding to the term in $a_0 \alpha_V^2$. The amplitude of the vibrations being unknown, this scale factor error cannot be compensated.

The term of order 2 is only partly reduced by the differential processing. There is therefore also a nonlinearity error corresponding to the term in $a_0^2$ and a bias error corresponding to the term in $\alpha_V^2$. Here again, this bias error cannot be compensated.

Another procedure consists in determining the acceleration from the difference of the square of the frequencies. This procedure is described in the French patent with the reference FR 2 590 991. The frequency of the sensor output signal is assumed to be connected to the acceleration by the following relations, with the same notation as previously:

$$\text{For pathway 1} \quad f_{I,1} \approx f_{0,1}\sqrt{1 + \frac{a_0 + \alpha_{V,1}\cos(2\pi f_R t)}{\gamma_{C,1}}}$$

$$\text{and for pathway 2} \quad f_{I,2} \approx f_{0,2}\sqrt{1 - \frac{a_0 + \alpha_{V,2}\cos(2\pi f_R t)}{\gamma_{C,2}}}$$

The device which makes it possible to extract the frequencies is modelled in the form of a transfer function having a unit gain and a zero phase shift for low frequencies, a gain $\beta$ and a phase shift $\phi$ for the frequency $f_R$ and a zero gain for the frequencies that are multiples of $f_R$. This device may, for example, be a PLL, the acronym standing for Phase-Locked Loop.

A finite expansion of order 3 then gives:

$$\frac{f_{I,1}}{f_{0,1}} = 1 + \frac{a_0 + \alpha_{V,1}\cos(2\pi f_R t)}{2\gamma_{C,1}} - \frac{a_0^2 + \alpha_{V,1}^2\cos^2(2\pi f_R t) + 2a_0\alpha_{V,1}\cos(2\pi f_R t)}{8\gamma_{C,1}^2} +$$

$$\frac{1}{16\gamma_{C,1}^3}\left[\begin{array}{c} a_0^3 + \alpha_{V,1}^3\cos^3(2\pi f_R t) + 3a_0\alpha_{V,1}^2 \\ \cos^2(2\pi f_R t) + 3a_0^2\alpha_{V,1}\cos(2\pi f_R t)\end{array}\right]$$

and $$\frac{f_{I,2}}{f_{0,2}} = 1 - \frac{a_0 + \alpha_{V,2}\cos(2\pi f_R t)}{2\gamma_{C,2}} - \frac{a_0^2 + \alpha_{V,2}^2\cos^2(2\pi f_R t) + 2a_0\alpha_{V,2}\cos(2\pi f_R t)}{8\gamma_{C,2}^2} -$$

$$\frac{1}{16\gamma_{C,2}^3}\left[\begin{array}{c} a_0^3 + \alpha_{V,2}^3\cos^3(2\pi f_R t) + 3a_0\alpha_{V,2}^2 \\ \cos^2(2\pi f_R t) + 3a_0^2\alpha_{V,2}\cos(2\pi f_R t)\end{array}\right]$$

At the output of the frequency estimation device, we have, in accordance with the above assumptions:

$$\frac{f_{s,1}}{f_{0,1}} = 1 + \frac{a_0 + \beta\alpha_{V,1}}{2\gamma_{C,1}}\cos(2\pi f_R t + \phi) - \frac{a_0^2 + \alpha_{V,1}^2/2 + 2a_0\alpha_{V,1}\beta\cos(2\pi f_R t + \phi)}{8\gamma_{C,1}^2} +$$

$$\frac{1}{16\gamma_{C,1}^3}\left[\begin{array}{c} a_0^3 + \alpha_{V,1}^3 \frac{3}{4}\beta\cos(2\pi f_R t + \phi) + \\ 3a_0\frac{\alpha_{V,1}^2}{2} + 3a_0^2\alpha_{V,1}\beta\cos(2\pi f_R t + \phi) \end{array}\right]$$

and $$\frac{f_{s,2}}{f_{0,2}} = 1 - \frac{a_0 + \beta\alpha_{V,2}}{2\gamma_{C,2}}\cos(2\pi f_R t + \phi) - \frac{a_0^2 + \alpha_{V,2}^2/2 + 2a_0\alpha_{V,2}\beta\cos(2\pi f_R t + \phi)}{8\gamma_{C,2}^2} -$$

$$\frac{1}{16\gamma_{C,2}^3}\left[\begin{array}{c} a_0^3 + \alpha_{V,2}^3 \frac{3}{4}\beta\cos(2\pi f_R t + \phi) + \\ 3a_0\frac{\alpha_{V,2}^2}{2} + 3a_0^2\alpha_{V,2}\beta\cos(2\pi f_R t + \phi) \end{array}\right]$$

These two frequencies are squared and the low-frequency terms are retained.

$$f_{S,1}^2 = f_{0,1}^2\left[1 + \frac{a_0}{\gamma_{C,1}} + \frac{\alpha_{V,1}^2}{8\gamma_{C,1}^2}(\beta^2 - 1) + \frac{a_0\alpha_{V,1}^2}{8\gamma_{C,1}^3}(1 - \beta^2)\right]$$

and $$f_{S,2}^2 = f_{0,2}^2\left[1 - \frac{a_0}{\gamma_{C,2}} + \frac{\alpha_{V,2}^2}{8\gamma_{C,2}^2}(\beta^2 - 1) - \frac{a_0\alpha_{V,2}^2}{8\gamma_{C,2}^3}(1 - \beta^2)\right]$$

By performing the differential processing, we obtain:

$$\frac{f_{S,1}^2 - \frac{f_{0,1}^2}{f_{0,2}^2}f_{S,2}^2}{f_{0,1}^2} =$$

$$a_0\left(\frac{1}{\gamma_{C,1}} + \frac{1}{\gamma_{C,2}}\right) + \frac{(\beta^2 - 1)}{8}\left(\frac{\alpha_{V,1}^2}{\gamma_{C,1}^2} - \frac{\alpha_{V,2}^2}{\gamma_{C,2}^2}\right) + \frac{a_0(1 - \beta^2)}{8}\left(\frac{\alpha_{V,1}^2}{\gamma_{C,1}^3} + \frac{\alpha_{V,2}^2}{\gamma_{C,2}^3}\right)$$

If the sensor is subject to vibrations and if the device for calculating the frequencies does not ensure wideband demodulation, that is to say if β is different from 1, a scale factor error and a bias error which cannot be completely eliminated by the differential processing are again found. These errors are not compensatable.

SUMMARY OF THE INVENTION

The system according to the invention does not exhibit the above drawbacks. It is known that the spectrum of the output signal is centred on the frequency $f_{a0}$ equal to the sum of the central frequency of the resonator and of a deviation due to the low-frequency acceleration $a_0$ applied to the sensor. This spectrum comprises lines situated at the frequencies $f_{a0} \pm k \cdot f_R$ due to the vibrations. The system according to the invention implements an algorithm realizing a wideband demodulation of the sensor output signal, taking into account the lines of significant amplitude. The algorithm is based on rigorous theoretical relations between the stiffness variation induced by the acceleration and the parameters characteristic of the sensor output signal which are the instantaneous amplitude and the instantaneous frequency. Theoretically, the spectrum of the output signal contains lines at frequencies below $f_R$. In practice, given the frequencies and the modulation indices involved, these lines are of negligible amplitudes. It is therefore possible to consider that the spectral support of the signal is disjoint from the vibration terms which are of lower frequency than it. On account of these lines, the spectrum of the signal extends over a wideband. It is necessary for the sampling frequency to be high enough to contain the spectrum of the signal. For example, with the modulation indices and the frequencies involved for the accelerometers at the level of the rest resonant frequency and vibrations, the order of magnitude of the sampling frequency must be 250 kHz.

More precisely, the subject of the invention is a system for analysing the oscillation frequency of a device vibrating along an axis, said system comprising means for measuring the position A of the device along this axis, the signal emanating from said means and representative of the position A being represented by a time dependent function U, characterized in that said system comprises first means making it possible to calculate the function $$\omega_1^2 - \frac{\rho_1^{(2)}}{\rho_1},$$

$\omega_1$ being the instantaneous angular frequency of U, $\rho_1$ its instantaneous amplitude and $\rho_1^{(2)}$ the second derivative of said instantaneous amplitude, the function $$\omega_1^2 - \frac{\rho_1^{(2)}}{\rho_1}$$

being representative of the square of the resonant angular frequency Ω of the vibrating device.

Advantageously, said first means comprise means for calculating the second derivative of the function U denoted $U^{(2)}$, the Hilbert transform of the function U denoted V, the second derivative of this Hilbert transform denoted $V^{(2)}$ as well as a first function equal to $$-\frac{U \cdot U^{(2)} + V \cdot V^{(2)}}{U^2 + V^2}$$

mathematically equal to $$\omega_1^2 - \frac{\rho_1^{(2)}}{\rho_1},$$

representative of the square of the resonant angular frequency Ω of the vibrating device.

Advantageously, when the differential equation representative of the variations in the position A of the device comprises nonlinearity terms of order 3, said device then comprises second means making it possible to realize, using the previous notation, a second function equal to $$-\frac{V^{(2)}V + U^{(2)}U}{U^2 + V^2} - \beta_i\left[\frac{3}{4K_1^2}(U^2 + V^2)\right],$$

representative of the square of the resonant angular frequency $\Omega$ of the vibrating device, $\beta_i$ and $K_1$ being constants.

Advantageously, when the vibrating device has forced oscillations, that is to say the device comprises a phase- and amplitude-slaving disposed in such a way as to eliminate the natural damping of the device, said slaving generating a polarization $V_0$, said device then comprises third means making it possible to realize, using the previous notation, a third function equal to $$-\frac{V^{(2)}V + U^{(2)}U}{U^2 + V^2} - \beta_i\left[\frac{3}{4K_1^2}(U^2 + V^2) + 3\left(\frac{K_3 V_0^2}{-\frac{UU^{(2)} + VV^{(2)}}{U^2 + V^2}}\right)^2\right],$$

representative of the square of the resonant angular frequency $\Omega$ of the vibrating device, $\beta_i$, $K_1$ and $K_3$ being constants.

Advantageously, the square of the resonant angular frequency is linked to a parameter a to be measured by the relation:

$$\Omega^2 = \omega_0^2\left(1 + \frac{a}{\gamma_C}\right)\gamma_C$$

being a constant, $\omega_0$ being the initial angular frequency in the absence of said parameter.

Advantageously, the vibrating device comprises two identical means of vibration, each of the means being connected to the analysis system, said system comprising:
  measurement means able to calculate on the one hand, either a first function or a second function or a third function representative of the square of the resonant angular frequency $\Omega_1$ of the first means of vibration and on the other hand either a first function or a second function or a third function representative of the square of the resonant angular frequency $\Omega_2$ of the second means of vibration;
  means for calculating the following functions:

$$\Omega_1^2 - \frac{\omega_{01}^2}{\omega_{02}^2}\Omega_2^2$$

and $$\Omega_1^2 + \frac{\omega_{0,1}^2}{\omega_{0,2}^2}\frac{\gamma_{C,2}}{\gamma_{C,1}}\Omega_2^2$$

using the same notation as previously, the indices representing the first or the second means of vibration.

Advantageously, the analysis system is an electronic system, the function U being an electrical parameter, said system comprising means of digitizing and sampling the function U, first finite impulse response filters able to realize the Hilbert transform of an electronic function, second finite impulse response filters able to realize the derivative of an electrical function, delay lines making it possible to synchronize the various sampled signals, electronic means realizing the functions of summations, multiplication and division and band-stop filters and low-pass filters.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

As stated, the core of the invention relies on an algorithm realizing a wideband demodulation of the sensor output signal. This algorithm implements the Hilbert transforms and their properties.

Let $x(t)$ be a real signal, the Hilbert transform $\hat{x}(t)$ of $x(t)$ is defined by:

$$\hat{x}(t) = \frac{1}{\pi}\int \frac{x(u)}{t-u}du = \frac{1}{\pi}\lim_{H\to 0}\left(\int_{-\infty}^{t-H}\frac{x(u)}{t-u}du + \int_{t+H}^{\infty}\frac{x(u)}{t-u}du\right)$$

From the frequency point of view, if $X(f)$ and $\hat{X}(f)$ denote the respective Fourier transforms of $\hat{x}(t)$ and $x(t)$, we have:

$$\hat{X}(f) = -j\,sgn(f)X(f)$$

with $sgn(f)=+1$ for $f>0$ $sgn(f)=-1$ for $f<0$ and $sgn(f)=0$ for $f=0$

The analytic signal $z_x(t)$ is defined by $z_x(t)=x(t)+j\hat{x}(t)$. Its Fourier transform therefore equals, in view of the foregoing:

$$Z_x(f)=2X(f) \text{ if } f>0,$$

$$Z_x(f)=0 \text{ if } f<0$$

The spectrum not being symmetric, the signal $z_x(t)$ is complex. We put $z_x(t)=\rho(t)e^{j\phi(t)}$. $\rho(t)$ is the instantaneous amplitude of the signal x, $\phi(t)$ is the instantaneous phase of the signal x
We then have $$x(t)=\rho(t)\cos(\phi(t)) \text{ and } \hat{x}(t)=\rho(t)\sin(\phi(t))$$

We also have $\rho^2=x^2+\hat{x}^2$
We define $$\omega(t) = \frac{d\varphi}{dt},$$

the instantaneous angular frequency of the signal x

The following three properties of the Hilbert transform are used subsequently in the description:

When we have two signals x and y of disjoint spectral support, with x of lower frequency than y, the Hilbert transform of the product xy satisfies: $H(xy)=xH(y)$.

Let x(t) be a signal of instantaneous amplitude $\rho$ and of instantaneous phase $\phi$. It is assumed that $\rho$ is of lower frequency than $\cos(\phi)$. The Hilbert transform of $x^2$ is then $$\frac{1}{2}\rho^2(t)\sin(2\varphi(t))$$

and that of $x^3$ is $$\frac{1}{4}\rho^3[3\sin(\varphi)+\sin(3\varphi)]$$

Let I be a signal and Q its Hilbert transform, $\omega$ being the instantaneous angular frequency of I, $\rho$ being the instantaneous amplitude of I. We then have, using $I=\rho\cos(\phi)$ and $Q=\rho\sin(\phi)$, the following equality $$-\frac{II^{(2)}+QQ^{(2)}}{I^2+Q^2}=\omega^2-\frac{\rho^{(2)}}{\rho}$$

The position denoted $A_1$ of a first oscillator satisfies the following general differential equation, with the same notation as previously:

$$\text{Relation 2: } \frac{d^2 A_1}{dt^2}+\frac{\omega_{0,1}}{Q_{R,1}}\frac{dA_1}{dt}+\omega_{0,1}^2\left(1+\frac{a}{\gamma_{C,1}}\right)A_1+\beta_{i,1}A_1^3=e_1(t)$$

In the case where this resonator does not comprise any third-order nonlinearity term and in the case where the excitation term merely compensates exactly for the damping term, then relation 2 simplifies and becomes relation 2bis:

$$\frac{d^2 A_1}{dt^2}+\omega_{0,1}^2\left(1+\frac{a}{\gamma_{C,1}}\right)A_1=0$$

that may also be written:

$$\frac{d^2 A_1}{dt^2}+\Omega_{0,1}^2\cdot A_1=0$$

We can put $a=a_0+\alpha_V\cos(2\pi f_R t)$ $a_0$ representing the low-frequency useful part of the acceleration applied to the sensor and $\alpha_V$ being a constant representing the amplitude of the vibrations.

We put $I=A_1$ and we denote the Hilbert transform of I by Q. The spectrum of I is that of a signal modulated in frequency by a sine. We therefore have a principal line centred on the frequency $$f_{a,0,1}=\frac{\omega_{0,1}}{2\pi}\sqrt{1+\frac{a_0}{\gamma_{C,1}}}$$

and secondary lines at $f_{a0,1}\pm kf_R$.

By applying the Hilbert transform to relation 2bis, we then obtain:

$$\frac{d^2 Q}{dt^2}+\omega_{0,1}^2\left(1+\frac{a}{\gamma_{C,1}}\right)Q=0$$

By putting $I=\rho\cos(\phi)$ and $Q=\rho\sin(\phi)$, with $\rho$ the instantaneous amplitude of I and $\phi$ the instantaneous phase of I, in the above two differential equations, we obtain the following two equations $$\rho^{(2)}\cos(\varphi)-2\rho^{(1)}\omega\sin(\varphi)-\rho[\omega^{(1)}\sin(\varphi)+\omega^2\cos(\varphi)]=$$
$$-\omega_{0,1}^2\left(1+\frac{a}{\gamma_{C,1}}\right)\rho\cos(\varphi)$$

$$\rho^{(2)}\sin(\varphi)+2\rho^{(1)}\omega\cos(\varphi)+\rho[\omega^{(1)}\cos(\varphi)-\omega^2\sin(\varphi)]=$$
$$-\omega_{0,1}^2\left(1+\frac{a}{\gamma_{C,1}}\right)\rho\sin(\varphi)$$

In this formulation and in those which follow, the simplified notation for the derivatives is used, which consists in indicating the order of differentiation by an exponent between brackets. By multiplying the first relation by $\cos(\phi)$ and the second by $\sin(\phi)$, by performing a sum and dividing by $\rho$, the instantaneous amplitude not vanishing, we obtain:

$$\omega_{0,1}^2\left(1+\frac{a}{\gamma_{C,1}}\right)=\omega^2-\frac{\rho^{(2)}}{\rho}$$

In the case of a vibrating barrel accelerometer, the output voltage $U_1$ of the charge amplifier is proportional to the signal I. The spectrum of the oscillator position signal does not then comprise any low-frequency term. Denoting the instantaneous angular frequency of $U_1$ by $\omega_1$ and its instantaneous amplitude by $\rho_1$, we have $$\omega_1=\omega \text{ and } \frac{\rho_1^{(2)}}{\rho_1}=\frac{\rho^{(2)}}{\rho}.$$

We thus obtain $$\text{Relation 6 } \omega_{0,1}^2\left(1+\frac{a}{\gamma_{C,1}}\right)=\omega_1^2-\frac{\rho_1^{(2)}}{\rho_1}$$

On the basis of the function $$\omega_1^2-\frac{\rho_1^{(2)}}{\rho_1},$$

of the values $\omega_{0,1}$ and $\gamma_{c,1}$ situated in the left-hand side, it is then easy to determine a which is the sought-after parameter.

Denoting the Hilbert transform of $U_1$ by $V_1$ and using the third property of the Hilbert transform, we then have:

$$\text{Relation 7} \quad \omega_{0,1}^2\left(1 + \frac{a}{\gamma_{C,1}}\right) = \omega_1^2 - \frac{\rho_1^{(2)}}{\rho_1} = -\frac{U_1 U_1^{(2)} + V_1 V_1^{(2)}}{U_1^2 + V_1^2}$$

The function $$\omega_1^2 - \frac{\rho_1^{(2)}}{\rho_1}$$

and hence the term a can thus be calculated by virtue of the function $$-\frac{U_1 U_1^{(2)} + V_1 V_1^{(2)}}{U_1^2 + V_1^2}.$$

Figure 2:
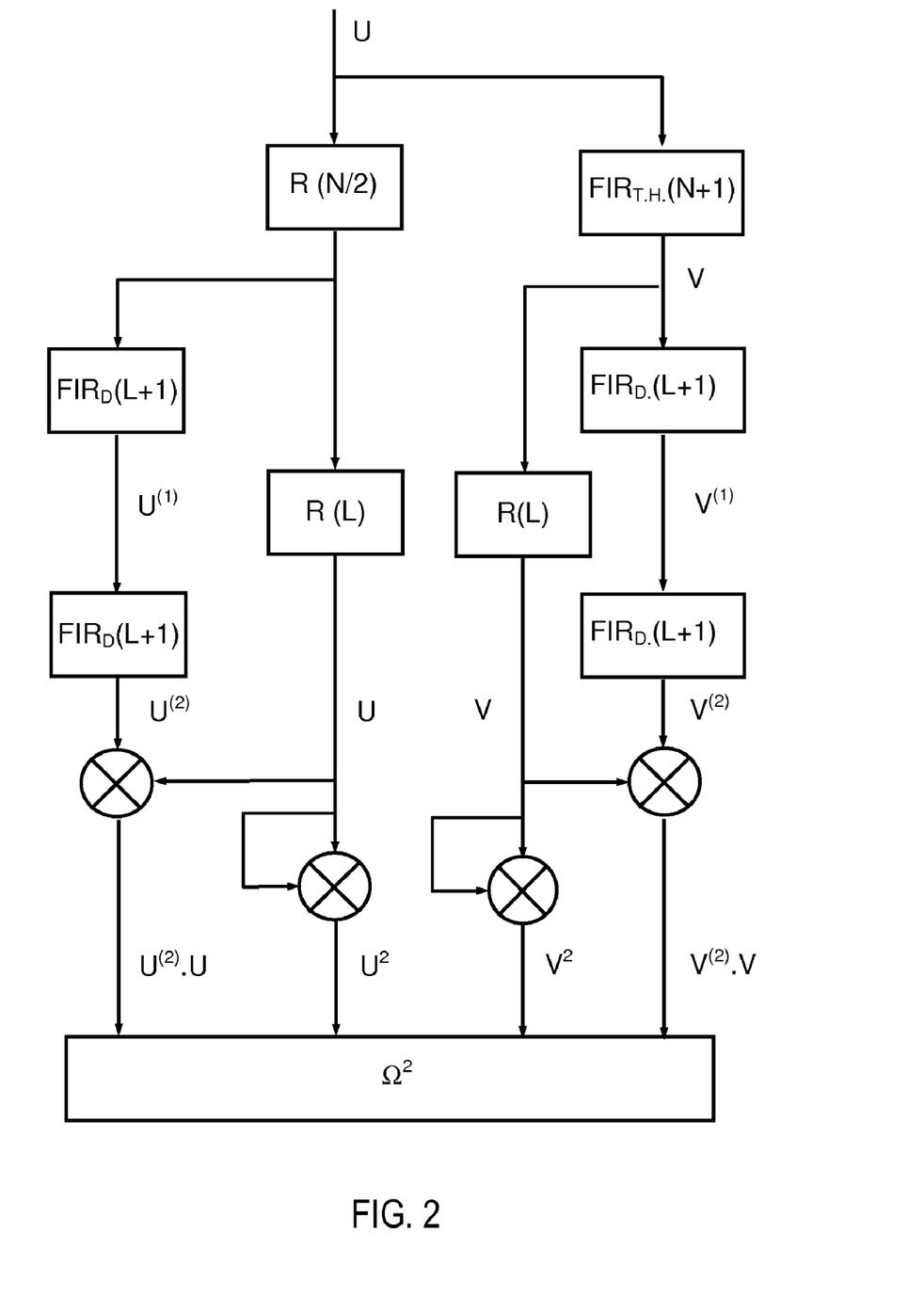
FIG. 2 represents the overview of the calculation according to the invention of the square of the angular frequencies of the system.

The practical realization of this function $$-\frac{U_1 U_1^{(2)} + V_1 V_1^{(2)}}{U_1^2 + V_1^2}$$

poses no particular technical problems and is represented, by way of example, in the overview of FIG. 2.

In this figure, each rectangle represents an electronic element affording a particular function. Thus, the Hilbert transform $V_1$ is obtained by virtue of a finite impulse response filter denoted $FIR_{TH}$ with N+1 points whose spectral band includes the lines of significant amplitude of the signal $U_1$. The derivatives of the signals are calculated by a finite impulse response filter denoted $FIR_D$ with L+1 points whose spectral band also includes these lines. In order to ensure the synchronization of the signals, the signal $U_1$ must be delayed by N/2 points so as to be synchronized with the signal $V_1$ by delay lines denoted R(N/2). Thereafter the signals $U_1$ and $V_1$ must be delayed by other delay lines denoted R(L) of L points so as to be synchronous with $U_1^{(2)}$ and $V_1^{(2)}$.

A wideband demodulation of the signal is thus achieved. The relation $$-\frac{II^{(2)} + QQ^{(2)}}{I^2 + Q^2} = \omega^2 - \frac{\rho^{(2)}}{\rho}$$

is always true regardless of I. The use of the algorithm employing the second derivative and the Hilbert transform with filters having a big enough passband makes it possible to perform a wideband demodulation of the signal. The use of this algorithm is applicable to any dynamic system whose behaviour is governed by a law of the type of relation 0. The application of this algorithm to the VBA accelerometer with no nonlinearity of order 3, makes it possible to obtain an item of information regarding the instantaneous acceleration together with the useful component and the vibrations. The useful component may be extracted therefrom by low-pass filtering.

It should be noted that by replacing I by $\rho \cos(\phi)$ and Q by $\rho \sin(\phi)$ in their respective differential equations, we obtain $2\rho\omega + \rho\dot\omega = 0$ i.e. $\omega\rho^2$=constant. Any instantaneous angular frequency variation caused by a variation in the acceleration applied to the sensor gives rise to an instantaneous amplitude variation. It is thus demonstrated that the sensor signal is not only modulated in frequency but also in amplitude. This amplitude modulation is not taken into account in the prior art procedures, thus giving rise to an additional error.

The complete differential equation satisfied by the resonator is now considered:

$$\frac{d^2 A_1}{dt^2} + \frac{\omega_{0,1}}{Q_{R,1}}\frac{dA_1}{dt} + \omega_{0,1}^2\left(1 + \frac{a}{\gamma_{C,1}}\right)A_1 + \beta_{i,1}A_1^3 = e_1(t)$$

The excitation term $e_1$ may be written $e_1 = K_{4,1}(V_0+v)^2 + K_{5,1}V_0^2$ With $V_0$: DC polarization voltage and v: variable voltage obtained on the basis of phase- and amplitude-slaving to the charge amplifier output voltage representing the sensor output signal. The voltage v therefore lies at the frequency of the resonator.

It is assumed that the phase- and amplitude-slaving is done perfectly. The damping term may be eliminated. In fact we have:

$$\frac{\omega_{0,1}}{Q_{R,1}}\frac{dA_1}{dt} = 2K_{4,1}V_0 v$$

The term $v^2$ possesses a component at twice the resonant frequency which does not intervene significantly in the equation and a continuous term that is negligible with respect to the square of the DC polarization voltage.

The equation thus becomes:

$$\text{Relation 8} \quad \frac{d^2 A_1}{dt^2} + \omega_{0,1}^2\left(1 + \frac{a}{\gamma_{C,1}}\right)A_1 + \beta_{i,1}A_1^3 = K_{3,1}V_0^2$$

with $K_{3,1} = K_{5,1} + K_{4,1}$

One seeks to decompose the solution of the motion into the form $A_1 = I + \Delta$
With I high-frequency signal whose spectrum is centred on $$f_{a0,1} = \frac{\omega_{0,1}}{2\pi}\sqrt{1 + \frac{a_0}{\gamma_{C,1}}}$$

with lines at $f_{a0,1} \pm kf_R$ and
$\Delta$ low-frequency term.

We reason firstly in the absence of nonlinearity of order 3. We then put $$\Delta = \frac{K_{3,1}V_0^2}{\omega_{0,1}^2\left(1 + \frac{a}{\gamma_{C,1}}\right)}.$$

We consider the solution I of the equation $$\frac{d^2 I}{dt^2} + \omega_{0,1}^2\left(1 + \frac{a}{\gamma_{C,1}}\right)I = 0.$$

I is a high-frequency signal whose spectrum is centred on $f_{a0,1}$.

$\Delta$ is a low-frequency frequency. It comprises lines at $f_R$, $2f_R$ ... due to the presence of vibrations in a, but these lines are of negligible amplitude. We therefore have $$\frac{d^2(I+\Delta)}{dt^2} \approx \frac{d^2 I}{dt^2}$$

In the absence of nonlinearity of order 3, we therefore decompose the solution of equation (8) into a high-frequency term and a low-frequency term $\Delta$ defined by $$\Delta = \frac{K_{3,1} V_0^2}{\omega_{0,1}^2 \left(1 + \frac{a}{\gamma_{C,1}}\right)}$$

We neglect the effect of the nonlinearity on this low-frequency term. Indeed, according to the orders of magnitude involved, we have $$\omega_{0,1}^2 \left(1 + \frac{a}{\gamma_{C,1}}\right) \gg \beta_{i,1}(I+\Delta)^2.$$

We therefore write $A_1 = I + \Delta$ with I a high-frequency term and $\Delta$ a low-frequency term defined by $$\Delta = \frac{K_{3,1} V_0^2}{\omega_{0,1}^2 \left(1 + \frac{a}{\gamma_{C,1}}\right)}.$$

Equation 8 may be written:

Relation 8bis $\frac{d^2(I+\Delta)}{dt^2} + \omega_{0,1}^2 \left(1 + \frac{a}{\gamma_{C,1}}\right)(I+\Delta) + \beta_{i,1}(I+\Delta)^3 = K_{3,1} V_0^2$ By applying the Hilbert transform to relation 8 bis with the same notation as previously, we obtain, denoting the Hilbert transform of $a\Delta$ by $H(a\Delta)$, relation 9 below:

$$\frac{d^2 Q}{dt^2} + \omega_{0,1}^2 \left(1 + \frac{a}{\gamma_{C,1}}\right) Q + \omega_{0,1}^2 \frac{H(a\Delta)}{\gamma_{C,1}} + \quad \text{Relation 9}$$

$$\beta_{i,1} \left(\frac{Q^3}{2} + \frac{3}{2} I^2 Q + 3\Delta I Q + 3\Delta^2 Q\right) = 0$$

By multiplying relation 8 bis by I and relation 9 by Q, we obtain:

$$\omega_{0,1}^2 \left(1 + \frac{a}{\gamma_{C,1}}\right) = -\frac{Q^{(2)}Q + I^{(2)}I}{I^2 + Q^2} -$$

$$\frac{\omega_{0,1}^2 H(a\Delta)Q}{\gamma_{C,1}(I^2+Q^2)} - \beta_{i,1}\left[\frac{Q^2}{2} + I^2 + 3\Delta I + 3\Delta^2 + \Delta^3 \frac{I}{I^2+Q^2}\right] +$$

$$\frac{K_{3,1} V_0^2 I}{I^2 + Q^2} - \omega_{0,1}^2 \left(1 + \frac{a}{\gamma_{C,1}}\right) \frac{\Delta I}{I^2 + Q^2}$$

In the right-hand side of the equation, the terms $H(a\Delta)$ and $a\Delta$ are unknown. They are not taken into account in the algorithm insofar as they cause a negligible error.

The terms in $\Delta I$, $\Delta^3 I$ and $K_{3,1} V_0^2 I$ are high-frequency terms. If they were taken into account in the algorithm, they would in any event be eliminated by the low-pass filter placed at the end of the processing so as to isolate the useful part of the acceleration lying in the low frequencies. We have the following relation $$I^2 + \frac{Q^2}{2} = \frac{3}{4}\rho^2 + \frac{\rho^2}{4}\cos(2\varphi).$$

The term $\rho^2 \cos(2\phi)$ does not lie in the useful frequency band either.

In view of these simplifications, the following relation is then obtained:

$$\omega_{0,1}^2 \left(1 + \frac{\hat{a}}{\gamma_{C,1}}\right) = -\frac{Q^{(2)}Q + I^{(2)}I}{I^2+Q^2} - \beta_{i,1}\left[\frac{3}{4}\rho^2 + 3\Delta^2\right]$$

$\hat{a}$ is the acceleration estimated by the algorithm. It comprises the low-frequency useful acceleration and the vibration terms.

$\Delta$ is estimated through the relation $$-\frac{I^{(2)}I + Q^{(2)}Q}{I^2+Q^2} \Delta = K_{3,1} V_0^2$$

The output voltage $U_1$ from the charge amplifier is proportional to the signal I. $U_1 = K_1 I$. The information $\Delta$ having a low-frequency spectrum is not present at the output of the charge amplifier. Relation 10 is thus obtained $$\Omega_1^2 = -\frac{V_1^{(2)}V_1 + U_1^{(2)}U_1}{U_1^2 + V_1^2} - \beta_{i,1} \begin{bmatrix} \frac{3}{4K_1^2}(U_1^2 + V_1^2) + \\ 3\left(\frac{K_{3,1}V_0^2}{-\frac{U_1 U_1^{(2)} + V_1 V_1^{(2)}}{U_1^2 + V_1^2}}\right)^2 \end{bmatrix}$$

The relation may be rewritten by using the third property of the Hilbert transform, denoting the instantaneous angular frequency of $U_1$ by $\omega_1$ and the instantaneous amplitude of $U_1$ by $\rho_1$. Relation 11 is then obtained $$\Omega_1^2 = \omega_1^2 - \frac{\rho_1^{(2)}}{\rho_1} - \beta_{i,1}\left[\frac{3}{4K_1^2}\rho_1^2 + 3\left(\frac{K_{3,1}V_0^2}{\omega_1^2 - \frac{\rho_1^{(2)}}{\rho_1}}\right)^2\right]$$

The estimated acceleration is obtained from this information through relation 12

$$\omega_{0,1}^2\left(1 + \frac{\hat{a}}{\gamma_{C,1}}\right) = \Omega_1^2 \qquad \text{Relation 12}$$

The acceleration can thus be estimated by virtue of the function $$\omega_1^2 - \frac{\rho_1^{(2)}}{\rho_1} - \beta_{i,1}\left[\frac{3}{4K_1^2}\rho_1^2 + 3\left(\frac{K_{3,1}V_0^2}{\omega_1^2 - \frac{\rho_1^{(2)}}{\rho_1}}\right)^2\right]$$

This function may be calculated by realizing the function $$-\frac{V_1^{(2)}V_1 + U_1^{(2)}U_1}{U_1^2 + V_1^2} - \beta_{i,1}\left[\frac{3}{4K_1^2}(U_1^2 + V_1^2) + 3\left(\frac{K_{3,1}V_0^2}{-\left(\frac{U_1U_1^{(2)} + V_1V_1^{(2)}}{U_1^2 + V_1^2}\right)}\right)^2\right]$$

The acceleration estimated by this algorithm does not contain any significant bias introduced by the vibrations. The information returned by the algorithm varies linearly as a function of the acceleration applied to the sensor.

Relative to the previous algorithm, two additional terms are seen to appear:

$$-\frac{3}{4K_1^2}\beta_{i,1}(U_1^2 + V_1^2)$$

a corrective term for the nonlinearity of order 3.

$$-\beta_{i,1}3\left(\frac{K_{3,1}V_0^2}{-\frac{U_1U_1^{(2)} + V_1V_1^{(2)}}{U_1^2 + V_1^2}}\right)^2$$

a corrective term for the DC polarization voltage.

Generally, two resonators having sensitive axes of like direction and of opposite sense are employed on two different pathways. In this case, there are similar relations linking $\Omega$ to the other parameters on each of the pathways. On path 1, we have the previous relation 12 and on pathway 2 relation 13 below, denoting the instantaneous angular frequency of $U_2$ by $\rho_2$ and the instantaneous amplitude of $U_2$ by $\omega_2$, $U_2$ being the voltage output by the filter on the second pathway $$\Omega_2^2 = \omega_2^2 - \frac{\rho_2^{(2)}}{\rho_2} - \beta_{i,2}\left[\frac{3}{4K_2^2}\rho_2^2 + 3\left(\frac{K_{3,2}V_0^2}{\omega_2^2 - \frac{\rho_2^{(2)}}{\rho_2}}\right)^2\right]$$

Using the third property of the Hilbert transform, it may be shown that the right-hand term of the above relation may be realized using $U_2$, its Hilbert transform denoted $V_2$ and their derivatives. The following relation is then obtained:

$$\Omega_2^2 = -\frac{V_2^{(2)}V_2 + U_2^{(2)}U_2}{U_2^2 + V_2^2} - \beta_{i,2}\left[\frac{3}{4K_2^2}(U_2^2 + V_2^2) + 3\left(\frac{K_{3,2}V_0^2}{-\left(\frac{U_2U_2^{(2)} + V_2V_2^{(2)}}{U_2^2 + V_2^2}\right)}\right)^2\right]$$

It may be shown in the same way that the acceleration may be estimated on this pathway by virtue of the relation:

$$\omega_{0,2}^2\left(1 - \frac{\hat{a}}{\gamma_{C,2}}\right) = \Omega_2^2 \qquad \text{Relation 15}$$

Starting from these two relations, it is possible to perform a differential processing, that is to say a processing which uses the information of the two pathways of the sensor and which determines on the basis of the information returned by each pathway not only the acceleration information but in addition the drifting of the main parameters due in particular to temperature.

The simple difference of the two items of information may be used, it being possible for the acceleration to be estimated by virtue of the relation $$\left(\frac{\omega_{0,1}^2}{\gamma_{C,1}} + \frac{\omega_{0,2}^2}{\gamma_{C,2}}\right)\hat{a} = \Omega_1^2 - \Omega_2^2 - (\omega_{0,1}^2 - \omega_{0,2}^2)$$

However, if the terms in $\omega_0$ and in $\gamma_C$ drift and are dependent on a parameter such as the temperature, then poor estimation of said temperature then causes:

a bias error through poor estimation of the term $\omega_{0,1}^2 - \omega_{0,2}^2$ a scale factor error through poor estimation of the term $$\left(\frac{\omega_{0,1}^2}{\gamma_{C,1}} + \frac{\omega_{0,2}^2}{\gamma_{C,2}}\right).$$

These difficulties may in particular be circumvented by using a more suitable differential processing. It was seen that the acceleration was connected to the information returned on the two pathways by relations 11 and 13. The following two quantities are estimated:

weighted difference of the two items of information $$\Omega_1^2 - \frac{\omega_{0,1}^2}{\omega_{0,2}^2}\Omega_2^2$$

weighted sum of the two items of information $$\Omega_1^2 + \frac{\omega_{0,1}^2}{\omega_{0,2}^2}\frac{\gamma_{C,2}}{\gamma_{C,1}}\Omega_2^2$$

We then have the following relations:

$$\Omega_1^2 - \frac{\omega_{0,1}^2}{\omega_{0,2}^2}\Omega_2^2 = \omega_{0,1}^2\left(\frac{1}{\gamma_{C,1}} + \frac{1}{\gamma_{C,2}}\right)\hat{a} \qquad \text{Relation 16}$$

$$\Omega_1^2 + \frac{\omega_{0,1}^2}{\omega_{0,2}^2}\frac{\gamma_{C,2}}{\gamma_{C,1}}\Omega_2^2 = \omega_{0,1}^2\left(1 + \frac{\gamma_{C,2}}{\gamma_{C,1}}\right) \qquad \text{Relation 17}$$

The estimated acceleration of relation 16 then comprises the useful part and the vibration terms.

By assuming that the critical acceleration and that the rest frequency vary according to an exponential law as a function of temperature, the ratios $$\frac{\omega_{0,1}^2}{\omega_{0,2}^2}\frac{\gamma_{C,2}}{\gamma_{C,1}} \text{ and } \frac{\omega_{0,1}^2}{\omega_{0,2}^2}$$

are independent of temperature and may also be calibrated. The weighted sum of the two items of information therefore theoretically depends only on the temperature and does not depend on the acceleration. By virtue of the weighted sum of $\Omega_1^2$ and of $\Omega_2^2$ of relation 17, it is thus possible to estimate the temperature and then determine the acceleration by virtue of relation 16. The weighted difference thus makes it possible to circumvent the bias error due to poor estimation of the temperature.

These two relations may be rewritten by expressing the physical parameters as temperature dependent polynomials. It is assumed that the weighted sum depends on the temperature and also on the acceleration. We thus obtain $$(\alpha_0 + \alpha_1 T + \alpha_2 T^2)\hat{a} = \Omega_1^2 - \frac{\omega_{0,1}^2}{\omega_{0,2}^2}\Omega_2^2$$

$$\delta_0 + \delta_1 T + \delta_2 T^2 + \delta_3 \hat{a} + \delta_4 \hat{a}T = \Omega_1^2 + \frac{\omega_{0,1}^2}{\omega_{0,2}^2}\frac{\gamma_{C,2}}{\gamma_{C,1}}\Omega_2^2$$

The coefficients $\alpha_i$ and $\delta_i$ are known by calibration. The useful acceleration and the temperature may therefore be deduced from the information $\Omega_1^2$ and $\Omega_2^2$.

Figure 3:
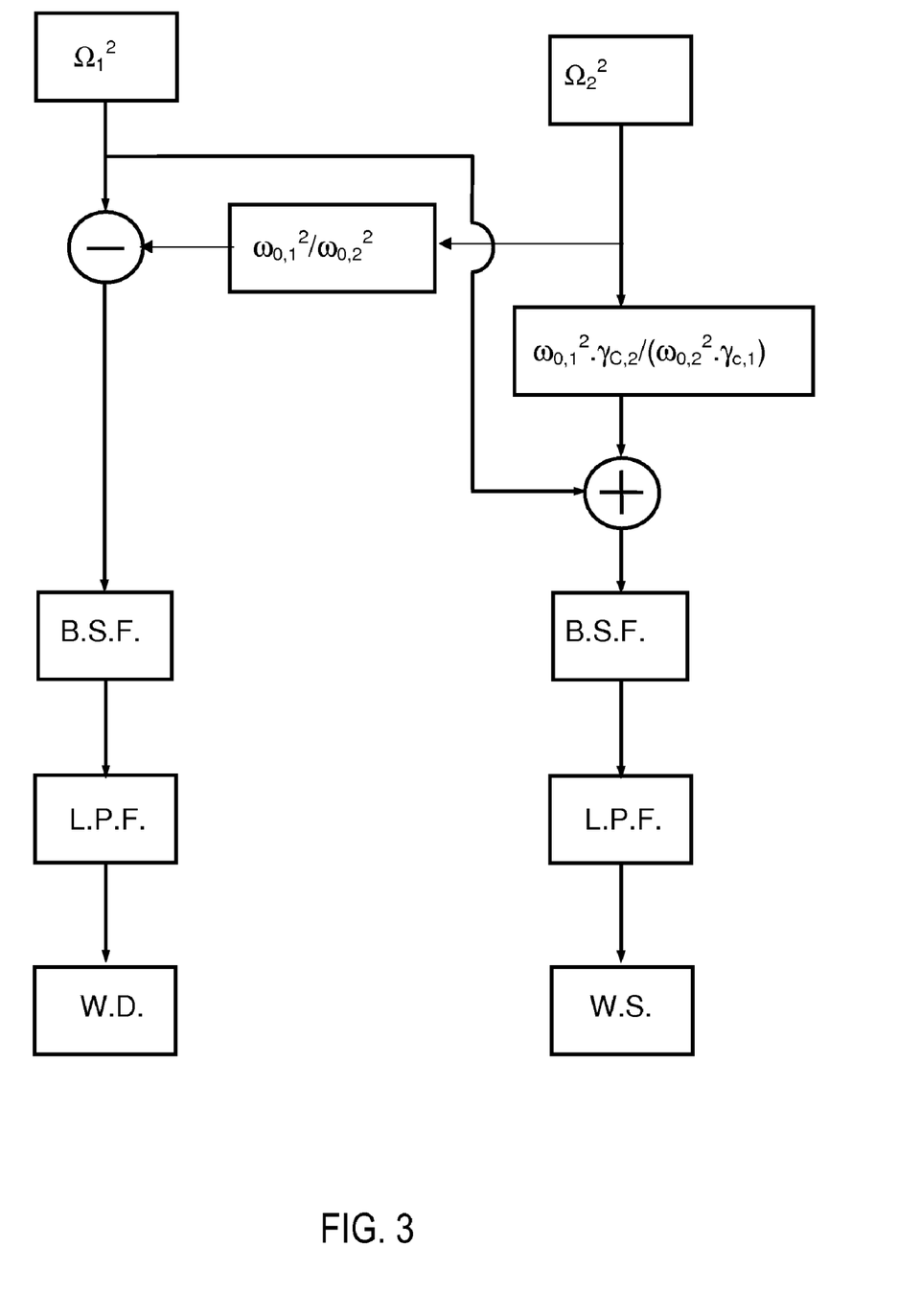
FIG. 3 represents the overview of the calculation of the parameters to be measured by differential processing.

Practical realization does not pose any particular problems. By way of example, the differential processing is represented in FIG. 4. The weighted sum and the difference are filtered by a band-stop filter denoted B.S.F. centred on the frequency of the vibrations and by a low-pass filter denoted L.P.F. The acceleration estimated by virtue of these relations at the output of the filters is then solely the useful acceleration.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An apparatus for analyzing the oscillation frequency of a device vibrating along an axis comprising:
   a vibrating element;
   at least one first electrode for measuring a position, A, of the vibrating element along the axis, wherein a time dependent detection signal, U, is generated in the at least one first electrode in response to variations in the position, A, wherein the at least one first electrode is connected to a processing means for calculating a first function $$\Omega = \omega_1^2 - \frac{\rho_1^{(2)}}{\rho_1},$$

where
   $\Omega$ is the square of the resonant angular frequency of the device,
   $\omega_1$ is the instantaneous angular frequency of U,
   $\rho_1$ is the instantaneous amplitude of U, and
   $\rho_1^{(2)}$ is the second derivative of $\rho_1$.

2. The apparatus of claim 1, wherein the processing means further calculates the second derivative of U, the Hilbert function of U, the second derivative of V, and a second function $$\Omega = -\frac{U \cdot U^{(2)} + V \cdot V^{(2)}}{U^2 + V^2},$$

where $U^{(2)}$ is the second derivative of U, V is the Hilbert function of U and $V^{(2)}$ is the second derivative of V.

3. The apparatus of claim 2, wherein the processing means calculates a third function $$\Omega = -\frac{V^{(2)}V + U^{(2)}U}{U^2 + V^2} - \beta_i\left[\frac{3}{4K_1^2}(U^2 + V^2)\right],$$

when variations in position, A, are expressed in terms of nonlinearity terms of the third order, where $\beta_i$ is a nonlinearity coefficient of the third order and $K_1$ is a constant.

4. The apparatus of claim 3, further comprising a second electrode generating a continuous voltage, $V_0$, producing forced oscillations in the vibrating element, wherein the processing means calculates a fourth function $$\Omega = -\frac{V^{(2)}V + U^{(2)}U}{U^2 + V^2} - \beta_i\left[\frac{3}{4K_1^2}(U^2 + V^2) + 3\left(\frac{K_3 V_0^2}{-\frac{UU^{(2)} + VV^{(2)}}{U^2 + V^2}}\right)^2\right],$$

where $K_3$ is a constant.

5. The apparatus of claim 1, wherein the processing means calculates a fifth function $$\Omega^2 = \omega_0^2\left(1 + \frac{a}{\gamma_C}\right),$$

where $\gamma_C$ is a constant and $\omega_0$ is the angular frequency of U when the vibrating element is under no forced oscillations.

6. The apparatus of claim 4, wherein the device further comprising a plurality of vibrating elements, each of the plurality of vibrating elements being adjacent to one of the at least one first electrode, wherein the processing means calculates the square of the resonant angular frequency of each of the plurality of vibrating elements using the second function, the third function or the fourth function, and wherein the processing means calculates a sixth function $$\Omega = \Omega_1^2 - \frac{\omega_{0,1}^2}{\omega_{0,2}^2}\Omega_2^2$$

and a seventh function $$\Omega = \Omega_1^2 + \frac{\omega_{0,1}^2}{\omega_{0,2}^2}\frac{\gamma_{C,2}}{\gamma_{C,1}}\Omega_2^2,$$

where $\Omega_1$ is a square of the resonant angular frequency of a first of the plurality of vibrating elements and $\Omega_2$ is a square of the resonant angular frequency of a second of the plurality of vibrating elements.

7. The apparatus of claim 2, wherein the apparatus is an electronic system and the time dependent detection signal, U, is an electrical parameter, the processing means comprising:
a first finite impulse response filter to calculate the Hilbert transform of U generated in the at least one first electrode; and
a second finite impulse response filter to calculate the second derivatives of U, V and $\rho_1$; the apparatus further comprising
a plurality of band-stop filters; and
a plurality of low-pass filters.

8. The apparatus of claim 3, wherein the apparatus is an electronic system and the time dependent detection signal, U, is an electrical parameter, the processing means comprising:
a first finite impulse response filter to calculate the Hilbert transform of U generated in the at least one first electrode; and
a second finite impulse response filter to calculate the second derivatives of U, V and $\rho_1$;
the apparatus further comprising
a plurality of band-stop filters; and
a plurality of low-pass filters.

9. The apparatus of claim 4, wherein the apparatus is an electronic system and the time dependent detection signal, U, is an electrical parameter, the processing means comprising:
a first finite impulse response filter to calculate the Hilbert transform of U generated in the at least one first electrode; and
a second finite impulse response filter to calculate the second derivatives of U, V and $\rho_1$;
the apparatus further comprising
a plurality of band-stop filters; and
a plurality of low-pass filters.

10. The apparatus of claim 5, wherein the apparatus is an electronic system and the time dependent detection signal, U, is an electrical parameter, the processing means comprising:
a first finite impulse response filter to calculate the Hilbert transform of U generated in the at least one first electrode; and
a second finite impulse response filter to calculate the second derivatives of U, V and $\rho_1$;
the apparatus further comprising
a plurality of band-stop filters; and
a plurality of low-pass filters.

11. The apparatus of claim 6, wherein the apparatus is an electronic system and the time dependent detection signal, U, is an electrical parameter, the processing means comprising:
a plurality of first finite impulse response filters to calculate the Hilbert transform of U generated in each of the at least one first electrode;
a plurality of second finite impulse response filters to calculate the second derivatives of U, V and $\rho_1$ for the U generated in each of the at least one first electrode; and
a plurality of delay lines to synchronize U for each of the at least one first electrode; the apparatus further comprising
a plurality of band-stop filters; and
a plurality of low-pass filters.

* * * * *